US005129809A

United States Patent [19]

Bruns et al.

[11] Patent Number: 5,129,809

[45] Date of Patent: Jul. 14, 1992

[54] PRESS FOR CERAMIC FORMED PARTS, IN PARTICULAR CERAMIC TILES

[75] Inventors: Rainer Bruns; Rolf Jung, both of Trier; Martin Mick, Foehren, all of Fed. Rep. of Germany

[73] Assignee: Laeis GmbH, Trier, Fed. Rep. of Germany

[21] Appl. No.: 626,218

[22] Filed: Dec. 12, 1990

Related U.S. Application Data

[63] Continuation of Ser. No. 552,806, Nov. 27, 1989, abandoned, which is a continuation of Ser. No. 188,257, Apr. 29, 1988, abandoned.

[30] Foreign Application Priority Data

Apr. 30, 1987 [DE] Fed. Rep. of Germany ....... 3714420

[51] Int. Cl.[5] ........................ B29C 43/00; B30B 15/00

[52] U.S. Cl. .................................... 425/406; 425/412

[58] Field of Search ................ 425/77, 143, 149, 150, 425/170, 354, 355, 356, 357, 394, 398, 406, 411, 412, 414, 416, 454, 456, 467, 469

[56] References Cited

U.S. PATENT DOCUMENTS 1,974,214 9/1934 Glasner et al. ...................... 425/354
2,302,132 11/1942 MacMillin et al. ................ 425/406
3,380,117 4/1968 Gluck ................................ 425/143
3,535,754 10/1970 Walchhutter ...................... 425/411
3,830,615 8/1974 Walchhuetter ..................... 425/457
4,523,748 6/1985 Latter ............................... 425/77

FOREIGN PATENT DOCUMENTS 860773 12/1952 Fed. Rep. of Germany ...... 425/406
3135698 3/1983 Fed. Rep. of Germany .

*Primary Examiner*—Jay H. Woo
*Assistant Examiner*—C. Scott Bushey
*Attorney, Agent, or Firm*—Edmund M. Jaskiewicz

[57] ABSTRACT

The invention relates to a press for ceramic formed parts, in particular tiles, whereby there is disposed within an upper beam of the press an oil storage container in the form of a storage volume chamber integrally incorporated in the upper beam. A filling valve is provided between the storage volume chamber and the main press cylinder which is also integrally incorporated in the upper beam. The main press cylinder is formed as a main press chamber and has the filling valve which is mounted on the chamber wall by way of holding flange. A press of the aforedescribed construction is downtime-friendly and maintenance-friendly and has a rapid cycling time and a high output. Moreover, it manufactures a good quality of pressed parts.

8 Claims, 1 Drawing Sheet

PRESS FOR CERAMIC FORMED PARTS, IN PARTICULAR CERAMIC TILES

This is a continuation of application Ser. No. 07/552,806 filed Nov. 27, 1989, now abandoned, which is a continuation of Ser. No. 188,257 filed Apr. 29, 1988, now abandoned.

BACKGROUND OF THE INVENTION

The invention relates to a press for ceramic formed parts, in particular tiles. Such a press generally has an upper and lower beam and a hydraulic cylinder which loads an upper press punch and a lower press punch, as well as a form frame and a filling arrangement for the mass which is to be compressed.

A press of the aforedescribed type is, for example, known in the art and is disclosed in published German patent application No. DE-OS3135698. Such a press is generally constructed as a column press, whereby the columns which extend between the upper and lower cross beams are prestressed over their entire length. A driving medium, for example hydraulic oil, which is stored in a storage tank, is arranged separately from the press and is used to supply the moving parts via a filling valve to a main press chamber of the press to which it is fluidly connected. A holding flange for supporting the filling valve is firmly secured by means of threaded bolts to the upper side of the upper cross beam. A piston which is loaded by means of the main press chamber as a piston plate is seated on the upper press punch, which is by means of guide bushings slidably mounted on bushings which surround the columns. A press of the aforedescribed type has certain drawbacks, which first of all reside in that the oil volume must be stored in a separate container. This entails not only a separate assembly input and manufacturing expense, but also has the drawback that long operational paths must be traversed and thereby the press efficiency is reduced and further the required operating temperature cannot be so rapidly obtained as is desirable. In view of the fact that the columns of the press are prestressed over their entire lengths the above-mentioned sleeves are provided for the guidance of the bushings which support the piston plate and further, for the bushing which supports the expulsion plate which supports the lower press punch. This also requires a considerable constructional input. To this must be added that the guiding of the piston plate and the expulsion plate at sleeves of the prestressed column requires that both plates have a relatively large mass, so that in this respect the construction is also disadvantageous. Consequently through-bending of the plates during pressing causes the pressing results to also be thereby influenced. As a result of mounting the holding flanges for the filling valve by means of threaded bolts in the upper side of the upper beam there results the further drawback, that the high pressure in the main pressure chamber acts via the filling valve and the holding flange on the screwed connection, so that the entire pressure is absorbed by the threaded bolts.

SUMMARY OF THE INVENTION

The invention has as its main object to provide a press of the aforedescribed type which distinguishes itself because it is downtime-friendly and has a maintenance-friendly construction as well as a rapid cycling time and thereby has an exceptional efficient output and further renders an excellent quality of pressed formed parts, such as, for example, tiles.

This object of the invention is solved in that a storage chamber for the hydraulic fluid for the press is substantially integrated into the upper beam.

In an advantageous construction in accordance with the invention the hydraulic cylinder is integrated into the upper beam and is formed as a plunger, which in turn loads the upper press punch which is acted on by the piston via a piston plate and coacts with the main press cylinder.

In an advantageous manner the main press chamber which is disposed in the plunger and the main press cylinder and the storage volume chamber which is disposed on the opposite side of the press cylinder are connected to each other by means of a filling valve. This filling valve is adjustable from the side of the storage volume chamber, by means of a control cylinder and is supported on a holding flange disposed in the main press chamber, which, from the side of the main press chamber is mounted by means of threaded bolts or the like on the wall which confronts the main press cylinder.

The storage volume chamber is shaped within the upper beam preferably in the form of a tub and has an upwardly rounded annular projection which is coaxially arranged around the filling valve.

Heating elements and/or operational scanning instruments and/or conducting elements may be arranged for the drive means in the storage volume chamber. Furthermore, there can be arranged a number of tensioning elements between the annular projection of the storage volume chamber and a cover which seals it. Finally a sucking channel can be provided which leads into the storage volume chamber on the sidewall of the upper beam and this sucking channel can be constructed simultaneously as a suspension eyelet for the press.

It is essentially not material if the press is constructed as a frame construction which has a frame connecting the upper and lower beams or whether the press is constructed as a column press. In case it is constructed as a column press it may be advantageously constructed as a two column press in which the columns are prestressed only in the region between the upper and lower beams.

It is of particular importance for the invention to provide that the piston rods, which adjoin the piston plate, are mounted in bores of the upper beam and are loaded by means of hydraulic high pressure via a side cylinder. This side cylinder extends only in the region between the columns. Braking rings are provided for the energy absorption of the piston plate. These rings are formed of an elastomeric material and can be arranged between the intermediate pieces secured to the upper beam and the piston plate.

The upper and lower beams are made out of an inexpensive spherical casting and the plunger, which serves as a pressure piston, is made out of hard-chill casting. As a result of such casting construction there is obtained a noise-dampening construction which is noise-dampening against air as well as body-transmitted noises.

For achieving a good pressing result a filling arrangement of special construction is also required. This arrangement, in a preferred embodiment of the invention, has in an advantageous manner a filling slider and an oscillating pipe disposed between it and a ceramic raw mass storage container which is disposed above it. The arrangement further includes in the vicinity of the filling slider and confronting it a chain drive guided via guide rollers which leads the outlet end of the oscillating pipe to a mass box. This mass box can, by way of support rollers which reciprocate the guide frame, coact with the oscillating pipe; the chain drive is cyclically drivable via one of the guide rollers by means of an electric motor.

The press of the invention has the following advantages:

By storing the oil volume in the upper beam a relatively reduced oil volume is required. As a result of directly storing the heating and control elements in the upper beam the press can be very rapidly brought to the operating temperature of the press and, consequently, by directly mounting the main press chamber in the upper beam a comparatively rapid cycling time and thereby a higher efficient output of the press is achieved. By shaping the storage volume chamber in the form of a tub in the neutral region, that is the central region of the upper beam, there results a reduction of the tension in the press cylinder region and at critical locations. By means of the construction in accordance with the invention the control valves can be arranged in the vicinity of their actual use, so that short pipe conduits and short operational paths are present. By the arrangement of the conduit elements, respectively blocking members in the storage volume chamber, that foamed oil reaching the pump sucking conduit is avoided. In addition thereto the oil may be under reduced atmospheric pressure, so that a dust contamination is avoided in the hydraulic oil and a rapid introduction into the main press chamber is favored. By constructing the main press cylinder as integrated with the plunger there results a reduced wear and reduced requirements for sealing elements, so that such a construction is downtime-friendly and maintenance-friendly. By prestressing the columns in a partial region, such as the region of the upper beam and by arranging a sealing ring between the upper beam and a shoulder of the column a good sealing in this region against oil leakage is assured. Since the piston plate has no column guidance, but the guidance and the safety against rotation is effected rather through the plunger and through the side cylinder only a relatively reduced mass is present, but the columns also do not need to be ground and hardened, so that further constructional simplification is achieved. By arranging the holding flange of the filling valve in the main press chamber and mounting it from that side there is achieved, that the pressure acts in the direction of the closing movement of the filling valve and thereby the pressure is well absorbed. In this way the construction of the sucking channel, formed as a suspension eyelet for the press, as well as an arrangement of the operating mirrors and stress surfaces and the casting of the press parts makes possible a simple operation and service of the press. Since, furthermore, the backside of the side cylinder can be loaded with high pressure, it is possible to counteract the reaction forces of the press so that the piston plate is hardly bent through. Otherwise the exteriorly disposed pressed parts of a multi-press for tiles, would be thicker than the interiorly disposed parts. These good pressing results are further improved by the construction of the filling arrangement in accordance with the invention which has a controlled movement by means of the oscillating pipe. It is necessary for a malfunction-free continuous operation for the press as well as for a flaw free production of the tiles that the mass of the press is fed in a flaw free and stable granular state.

BRIEF DESCRIPTION OF THE DRAWINGS

These and other objects and advantages of this invention will be apparent from the following description, in which.

DETAILED DESCRIPTION

Figure 1:
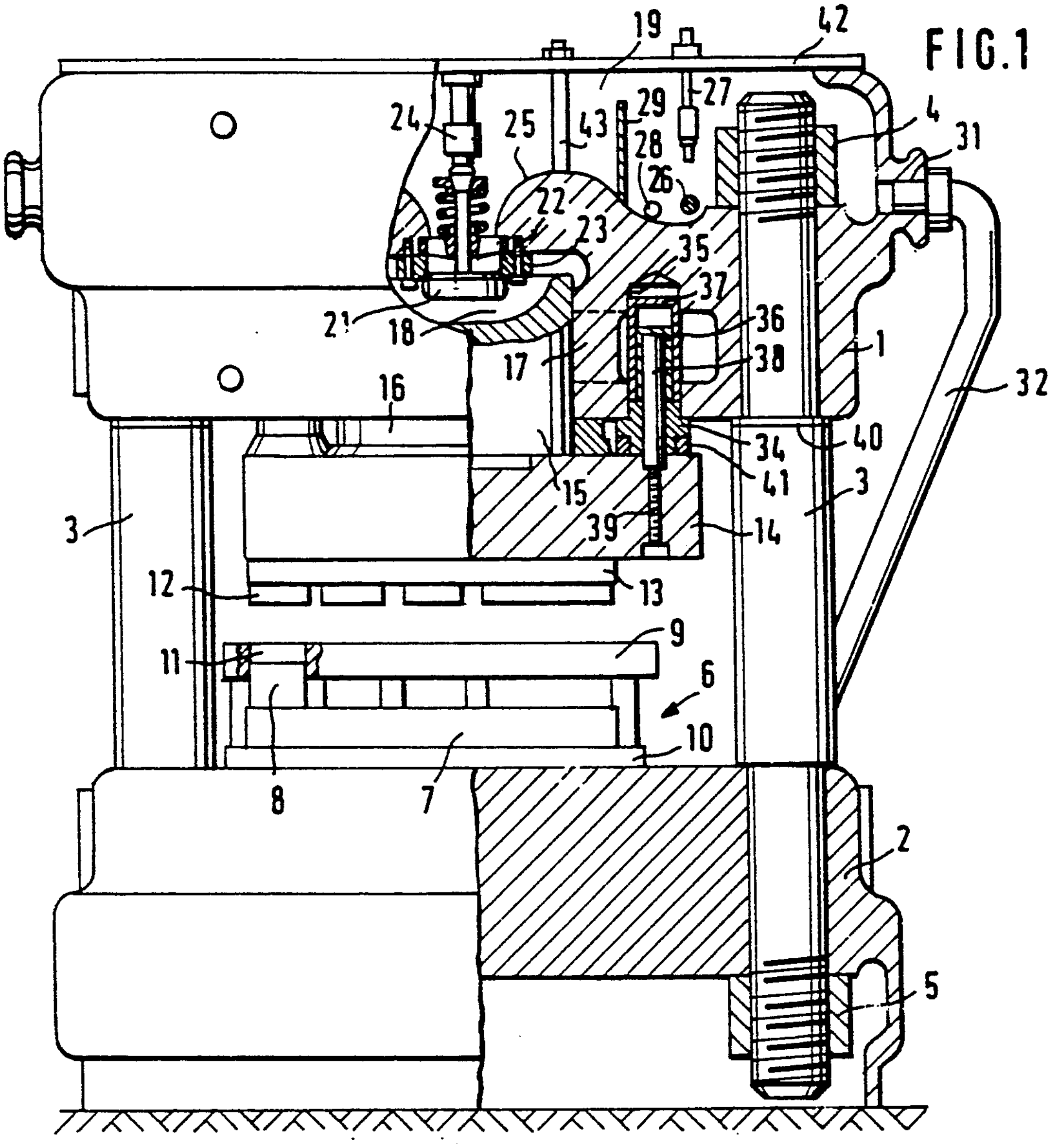
FIG. 1 is a side elevational view, partially in crosssection, of the press of this invention.
Figure 2:
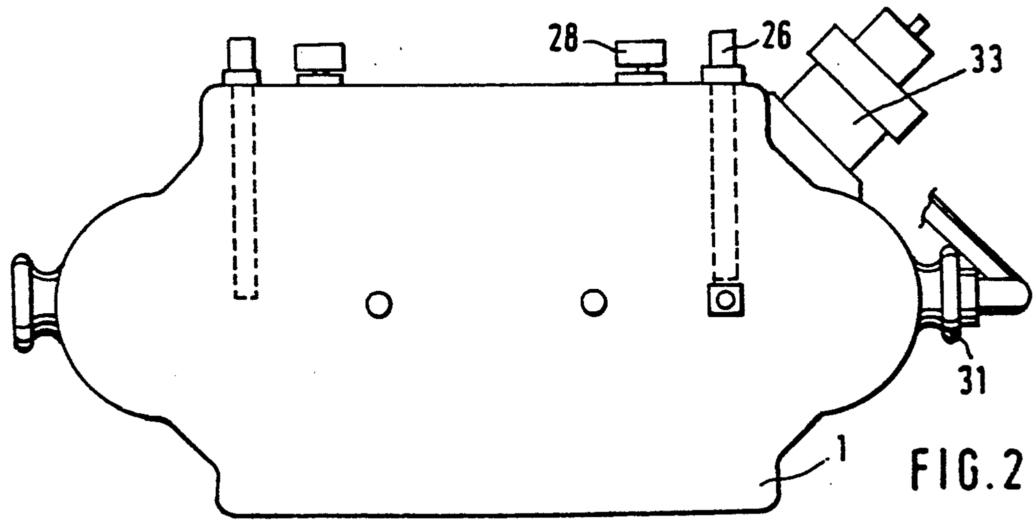
FIG. 2 is a top plan of the press illustrated in FIG. 1.

FIGS. 1 to 2 illustrate a machine for fabricating ceramic formed parts, in particular ceramic tiles. A suitable press includes an upper beam 1 made of a spherical casting, a lower beam 2 and prestressed columns 3 which extend through the region between the upper and lower beams 1 and 2. These columns 3 are prestressed on the backside of the upper beam 1 and the lower beam 2 by means of nuts 4 and 5, respectively mounted on the upper side of the upper beam 1 and the lower side of the lower beam 2. A forming pack 6 is seated on the lower beam 2, respectively the table plate 10, which has an expulsion plate 7 which includes a press stamp 8 seated thereon as well as a forming frame 9. Forming chambers 11 are formed by the lower press punch 8 and the forming frame 9 in which the formed parts, such as ceramic tiles or the like may be pressed. This is achieved with the aid of an upper pressed punch 12 which, by way of intermediate switching of a holding plate 13, are mounted on a piston plate 14. A pressing piston, formed as a plunger 15, is mounted centrally on the piston plate 14. This pressing piston is formed as a hardened, chill-cast pressure piston which is guided in a guide ring 16 in a hydraulic cylinder 17. The hydraulic cylinder 17 is constructed as a main press cylinder integrated in the upper beam 1 and a main press chamber 18 is disposed between the main press cylinder and the plunger. The main press chamber 18 can be sealingly joined to a storage volume chamber 19 for the drive medium, such as hydraulic oil. A filling valve 21, is adapted to fluidly connect the main press chamber 18 and storage volume chamber 19 or to seal one off with respect to the other. The filling valve 21 is mounted on a holding frame 23 which supports it by means of threaded bolts 22 against the side of the press cylinder 17 which confronts the holding frame 23. The valve 21 proper is adjustable by means of a control cylinder 24 which is mounted in the storage volume chamber 19. The storage volume chamber 19, shaped as a tub, includes a rounded annular projection 25 which concentrically surrounds the filling valve 21. There are mounted within the storage volume chamber 19 a number of heating elements 26, a level scanning mechanism 27, temperature detecting means 28 as well as conduit elements, respectively dam members 29. The latter dam members serve to prevent the introduction of foamed oil into a sucking channel 31 which is disposed in the sidewall of the upper beam 1 and a sucking conduit 32 which is fully connected to a non-illustrated feed pump. The sucking channel 31 is constructed to serve simultaneously as a suspension eyelet for the press so that the latter, respectively the upper beam 1, can be easily transported. The control valves 33 (FIG. 2), which have not been illustrated in detail, can be arranged in the vicinity of use in the region of the upper and lower beams. The plunger 15 is surrounded by intermediate members 34 which are disposed at a radial distance therefrom. These members 34 are located between the piston plate 14 and the lower wall of the upper beam 1 which confronts the intermediate members 34. Each one of the intermediate members 34 has a prolongation which extends upwardly in to mating bores 35 in the upper beam 1. In these prolongations there are slidably movably mounted side cylinders 36, each one which has a piston 37 and piston rod 38. The rod 38 is threadably mounted within the piston plate 14 via a threaded extension 39. Braking rings 41, consisting of an elastomeric material, are arranged between the column of each intermediate member 34 and the piston plate 14. The rear side of the piston 37 can be loaded with high pressure for the purpose of effecting pressing during the load of the return press force, so that a through bending of a piston plate 14 is reduced.

The storage volume chamber 19 is upwardly sealed within the upper beam 1 by means of a cover 42 on which are not only seated the level-scanning device 27 and the control cylinder 24 but this cover 42 also simultaneously serves for mounting thereon the tensioning elements 43 which are threadedly mounted in the annular projection 25 of the upper beam 1. In order to avoid an oil leak at the underside of the volume storage chamber 19 at the region of the columns 3, there are arranged sealing rings 40 between the upper beam 1 and the shoulder of the column 3, which effect a tight seal by coaction with the prestressed columns.

After the filling of the form chamber 11 with the corresponding amount of ceramic press mass, the upper piston plate 14 is moved downwardly via the side cylinders 36 in a rapid operation. With opened filling valve 21 the hydraulic oil arrives from the storage volume chamber 19 into the main press chamber 18, after the filling valve 21 is closed. Through a separate, and not individually illustrated conduit the pressure oil is then introduced into the main press chamber 18 and thereby there is exerted a press force via the plunger 15 and the piston plate 14 and the upper press punch 12.

It is understood that the invention is not limited to the single disclosed and described embodiment but it is, within in the spirit and scope of the claims, to adapt the invention to variations, changes and modifications. For example, it is not necessary that the press is constructed as a column press, but it also possible to construct it as a frame construction, in which the upper beam 1 and the lower beam 2 are connected to each other by means of a truss or frame construction.

We claim:

1. A press for making ceramic articles and comprising an upper beam and a lower beam, said upper beam having side wall means for defining therein an integral hydraulic actuating fluid storage chamber for receiving and storing a hydraulic actuating fluid therein and further defining therein an integral cylindrical bore, a hydraulic piston slidably guided in said cylindrical bore and having an end thereof directed towards said storage chamber, said piston end and said cylindrical bore defining therebetween a main pressure chamber, and a filling valve to communicate between said storage chamber and said main pressure chamber, said hydraulic piston having an other end and a platen on said other end engageable with a mold supported by said lower beam, said upper beam comprises a substantially rectangularly shaped bottom and side walls upstanding from said bottom to define with said bottom a container, said cylindrical bore being in said upper beam bottom, said bore having an upper end having a diameter enlarged beyond that of the bore to define with said upper end of said piston a main pressure chamber, said bottom further having a rounded annular projection having an opening therein spaced above said main pressure chamber, said filling valve being mounted in said opening.

2. A press as claimed in claim 1 and further comprising a control cylinder in said storage chamber operatively connected to a said filling valve to actuate the filling valve.

3. A press as claimed in claim 1 and further comprising a holding frame mounted in said main pressure chamber and said filling valve being supported on said holding frame.

4. A press as claimed in claim 3 wherein said cylindrical bore has a portion thereof directed towards said one end of said hydraulic piston, and means for attaching said holding frame to said portion of said cylindrical bore.

5. A press as claimed in claim 1 wherein said wall means comprises a rounded annular projection within said storage chamber concentrically surrounding said filling valve.

6. A press as claimed in claim 5 wherein said upper beam and said storage chamber have an open top, a cover closing said open top, and tensioning elements extending between said cover and said rounded annular projection within said storage chamber.

7. A press as claimed in claim 6 and further comprising monitor devices within said storage chamber and attached to said cover.

8. A press as claimed in claim 1 and further comprising means on an outer surface of said upper beam for defining a suction opening communicating with said storage chamber for said hydraulic actuating fluid, said suction opening being enclosed by a substantially cylindrical projection having an outer lip so as to define a suspension eyelet for the press.

* * * * *